United States Patent
Chen et al.

(10) Patent No.: US 7,552,178 B2
(45) Date of Patent: Jun. 23, 2009

(54) SYSTEM AND METHOD FOR RESPONSE MANAGEMENT IN MULTIPLE EMAIL RECIPIENTS

(75) Inventors: Yen-Fu Chen, Austin, TX (US); John Hans Handy-Bosma, Cedar Park, TX (US); Mei Yang Selvage, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 10/922,270

(22) Filed: Aug. 19, 2004

(65) Prior Publication Data

US 2006/0041626 A1 Feb. 23, 2006

(51) Int. Cl.
*G06F 15/16* (2006.01)
(52) U.S. Cl. .................................... 709/206
(58) Field of Classification Search .................. 709/206
See application file for complete search history.

(56) References Cited

U.S. PATENT DOCUMENTS

| | | | | |
|---|---|---|---|---|
| 5,878,230 | A | 3/1999 | Weber et al. | 395/200.68 |
| 6,122,632 | A * | 9/2000 | Botts et al. | 707/10 |
| 6,275,848 | B1 | 8/2001 | Arnold | 709/206 |
| 6,449,635 | B1 | 9/2002 | Tilden, Jr. et al. | 709/206 |
| 6,643,684 | B1 | 11/2003 | Malkin et al. | 709/206 |
| 6,823,368 | B1 * | 11/2004 | Ullmann et al. | 709/206 |
| 2002/0097850 | A1 | 7/2002 | Schemers et al. | 379/90.01 |
| 2002/0099777 | A1 * | 7/2002 | Gupta et al. | 709/206 |
| 2004/0073616 | A1 * | 4/2004 | Fellenstein et al. | 709/206 |
| 2004/0141004 | A1 * | 7/2004 | Cabezas et al. | 345/751 |

\* cited by examiner

*Primary Examiner*—Dustin Nguyen
*Assistant Examiner*—Jeong S Park
(74) *Attorney, Agent, or Firm*—Yee & Associates, P.C.; William H. Steinberg; Rudolf O. Siegesmund

(57) ABSTRACT

The disclosed invention is an improvement to a demand-based messaging system that enables multiple message recipients to coordinate responses to the message. The improved messaging system comprises a messaging program that provides an interface through which a recipient can indicate an intent to reply to the message. The messaging program then transmits this intent to other messaging programs so that other recipients receive the intent as status information when they open the message.

1 Claim, 3 Drawing Sheets

SYSTEM AND METHOD FOR RESPONSE MANAGEMENT IN MULTIPLE EMAIL RECIPIENTS

CROSS-REFERENCE TO RELATED APPLICATION

The present invention is related to the subject matter of U.S. patent application Ser. No. 10/880,729, incorporated herein by reference.

FIELD OF THE INVENTION

This invention is related to the field of electrical computers and digital processing systems to transfer data via one or more communications media, in general, and specifically, to a means for coordinating multiple responses to a single message in a demand based messaging system.

BACKGROUND OF THE INVENTION

A demand-based messaging system is any communication system that enables a person to exchange electronic messages with another person over a communications media. Demand-based messaging systems typically comprise a network of data processing machines and a messaging program operable on at least one machine to transfer electronic messages over the network to one or more of the other machines. Electronic messages typically are composed of a variety of information, including message data and transmission data. As those terms are used here, "message data" generally refers to the substance of the message, such as text or images, while "transmission data" generally refers to the information required to deliver or respond to the message, such as the correspondents' electronic addresses. Electronic messages also may include status information, such as the time and date that the message was composed, sent, or received.

LOTUS NOTES, MOZILLA, and MICROSOFT OUTLOOK are exemplary messaging programs that enable users to exchange electronic mail messages through networked computers. Instant messaging ("IM") programs such as MSN MESSENGER and YAHOO! MESSENGER, which have gained popularity in recent years, exemplify another embodiment of messaging programs that enable users to exchange electronic messages in real-time through networked computers.

A person often addresses a message to multiple recipients, and expects a response from one or more of the recipients. A team supervisor, for example, may send a question to the team without knowing who will be able to answer the question. Several team members may reply with the answer. Other team members may reply with information that is helpful, but not dispositive. Some team members may even reply with information on topics unrelated to the original question.

Responses from multiple message recipients, though, can cause problems for both the message originator and the message recipients, including duplicative effort, unnecessary delays, and general confusion. For example, a reply from one recipient may substantially repeat a reply from another recipient, which generally is considered a waste of time and resources. Conversely, uncoordinated replies may conflict with each other, thereby creating confusion among the originator and recipients. Replies from multiple recipients also can create multiple message threads (i.e. discussions about a specific topic), which one person (often the originator) must manage and reconcile. Generally, the frequency of these types of problems increases proportionally with number of recipients.

Many, if not all, of these problems may be attributed to a larger problem that is common in all prior art messaging systems—the lack of an effective means for coordinating responses from multiple recipients. Recipients often do not know who should reply, or even if a reply is necessary. Nor does a recipient have any way to know if another recipient intends to reply. Of course, correspondents can adopt rules to coordinate responses, but all correspondents must know these rules in advance, which makes it more difficult to introduce new correspondents (from a different team, for example). Another alternative is to designate the appropriate respondents within each message, but the message originator may not know this information in advance.

U.S. Pat. No. 5,878,230 (the '230 patent) discloses a method for an originator of an email to specify one or more recipients in a reply address field as the destination whenever the recipient replies to the note, but does not provide the originator with a method to specify which third parties are to receive the reply, nor does the '230 patent provide identification of parties as they respond to an email.

Thus, there is a need in the art for an integrated means to coordinate responses from multiple message recipients.

SUMMARY OF THE INVENTION

The disclosed invention is an improvement to a demand-based messaging system that enables multiple message recipients to coordinate responses to the message. The improved messaging system comprises a messaging program that provides an interface through which a recipient can indicate an intent to reply to the message. The messaging program then transmits this intent to other messaging programs so that other recipients receive the intent as status information when they open the message.

These and other objects of the invention will be apparent to those skilled in the art from the following detailed description of a preferred embodiment of the invention.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A person of ordinary skill in the art will appreciate that the present invention may be implemented in a variety of software and hardware configurations. It is believed, however, that the invention is described best as a computer program that configures and enables one or more general-purpose computers to implement the novel aspects of the invention.

As used herein, "computer" means a machine having a processor, a memory, and an operating system, capable of interaction with a user or other computer, and shall include without limitation desktop computers, notebook computers, tablet computers, personal digital assistants (PDAs), servers, handheld computers, and similar devices.

As used herein, "message" means an electronic mail message transmitted between user terminals over a computer network.

As used herein, "electronic mail" or "email" means direct user-to-user transmission of messages between user computers over a network.

Figure 1:
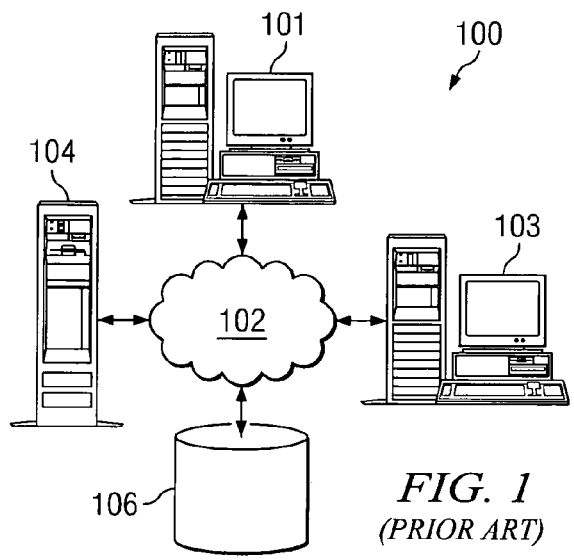
FIG. 1 depicts a computer network in which the invention may be employed.

FIG. 1 illustrates a common prior art architecture for connecting various hardware devices to create a network for transferring data. Computer network 100 comprises local workstation 101 electrically coupled to network connection 102. In FIG. 1, local workstation 101 is coupled electrically to remote workstation 103 via network connection 102. Local workstation 101 also is coupled electrically to server 104 and persistent storage 106 via network connection 102. Network connection 102 may be a simple local area network (LAN) or may be a larger wide area network (WAN), such as the Internet. While computer network 100 depicted in FIG. 1 is intended to represent a possible network architecture, it is not intended to represent an architectural limitation.

Figure 2:
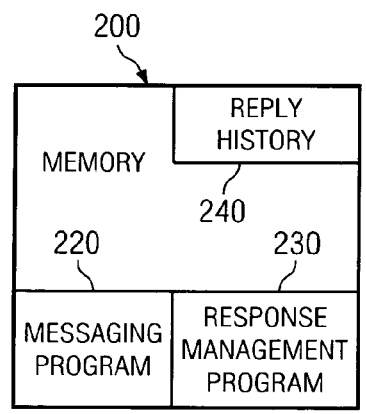
FIG. 2 depicts a representative computer memory in which the invention may reside.

The internal configuration of a computer, including connection and orientation of the processor, memory, and input/output devices, is well known in the art. FIG. 2 represents the internal configuration of a computer having the computer program of the present invention loaded into memory 200. The computer program of the present invention is depicted as Response Management Program (RMP) 230. Memory 200 also has messaging program 220 and reply history file 240. Memory 200 is only illustrative of memory within a computer and is not meant as a limitation.

In alternative embodiments, RMP 230 and reply history file 240 can be stored in the memory of other computers. Storing RMP 230 and reply history file 240, in the memory of other computers allows the processor workload to be distributed across a plurality of processors instead of a single processor. Further configurations of RMP 230 and reply history file 240 across various multiple memories and processors are known by persons skilled in the art.

Figure 3:
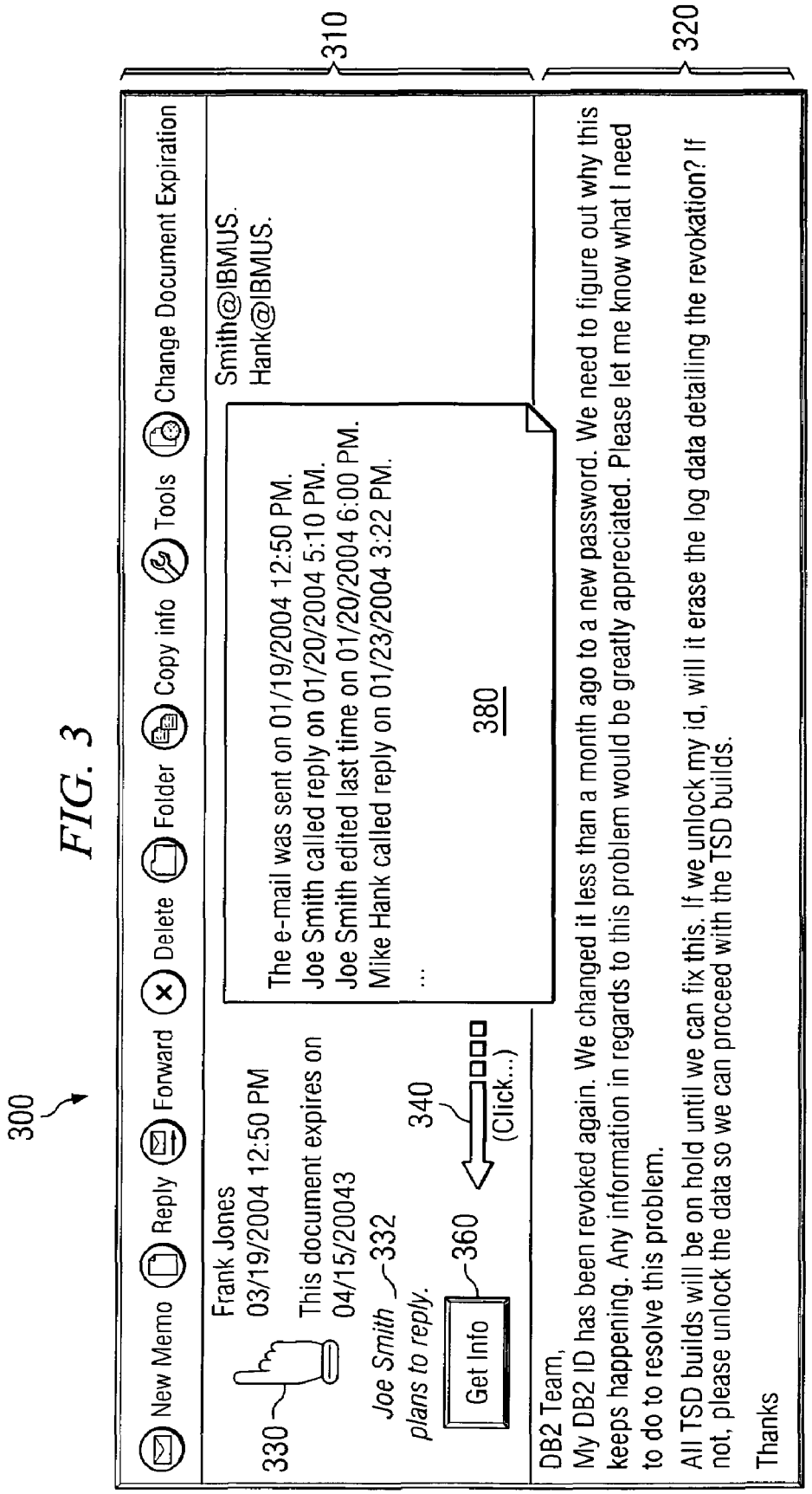
FIG. 3 depicts a representative email showing a reply summary window.

FIG. 3 depicts a representative email 300 with header 310 and message area 320. Header 310 has icon 330, reply summary 332, reply options icon 340, and get info button 360. Icon 330 is a visual depiction that a recipient has "called" the email and intends to reply. In the example, icon 330 shows a human hand pointing upward representing the gesture that a baseball player may use to indicate that he has called the ball and intends to catch the ball. Reply summary 332 is a short text message informing the user that a recipient, in this case "Joe Smith" intends to reply. Get info button 360 provides the user with a means to display reply status and history window 380. Upon clicking (or otherwise activating) get info button 360, reply status and history window 380 opens and displays the activity in regard to reply messages from the date and time that the originator sent the original email.

Figure 4:
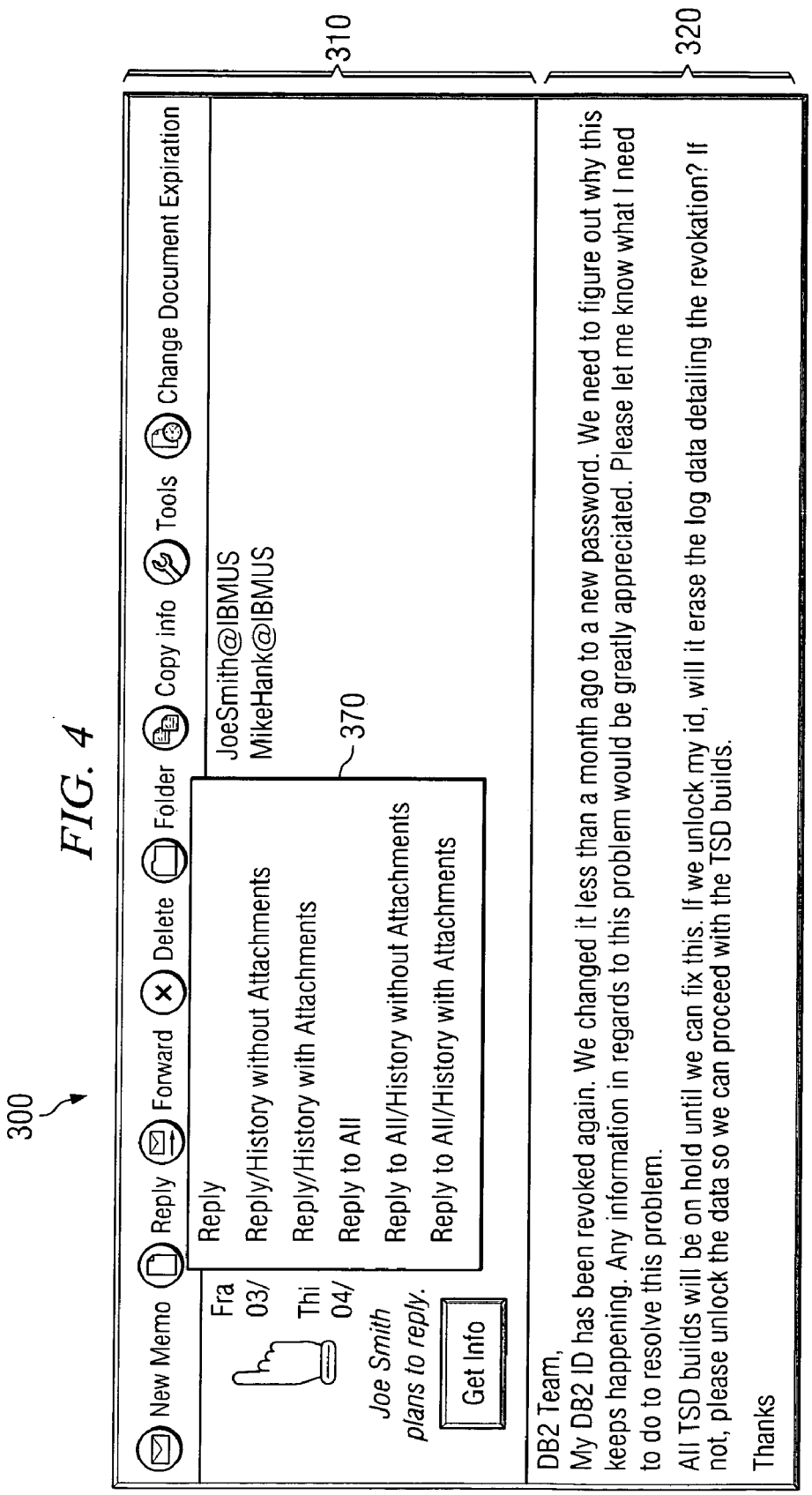
FIG. 4 depicts a representative email showing a reply option window.

FIG. 4 depicts email 300 where the user clicked reply options icon 340 (see FIG. 3) to bring up reply option window 370. The user may then select from the options displayed in reply option window 370. By way of example, and not by way of limitation, reply option window 370 contains selections to indicate reply to a particular addressee or to reply to all addressees. Additionally, the reply may be with history and attachments or with history and without attachments.

Figure 5:
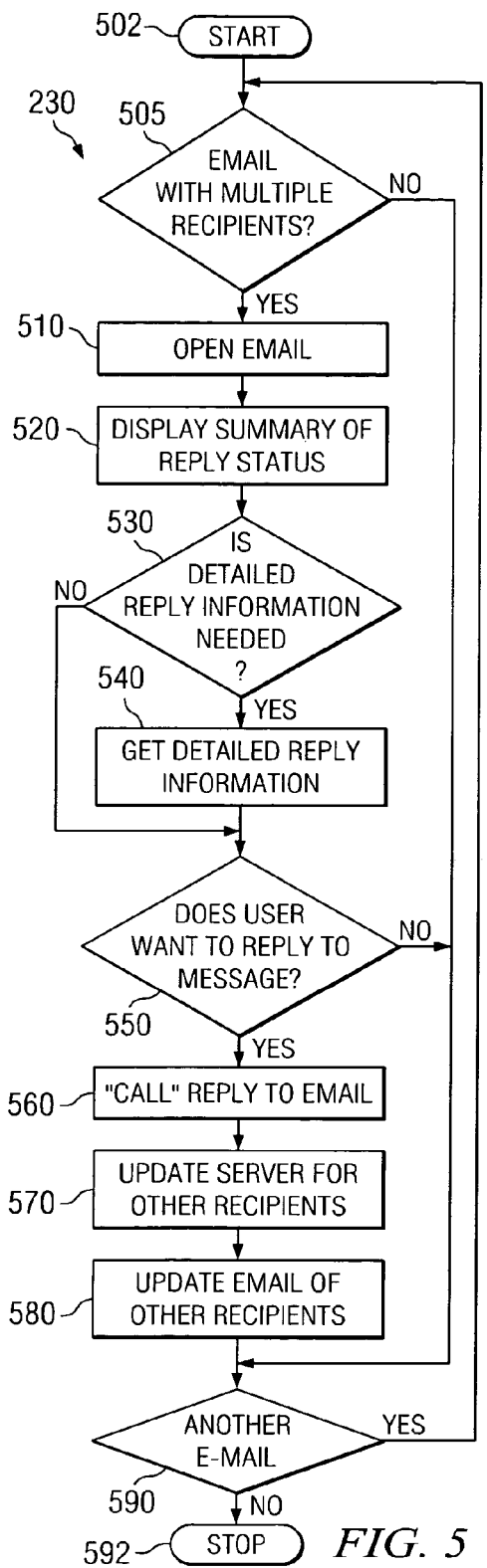
FIG. 5 depicts a flow chart of the response management program (RMP).

FIG. 5 depicts a flow chart of the RMP 230 process. RMP 230 starts (502) and determines whether there is an email with multiple recipients (505). If so, the email is opened (510). If not, RMP 230 goes to step 590. RMP 230 displays a summary of the reply status (520) (see reply summary 332 in FIG. 3). If one or more recipients of the same email have indicated that they will reply to the email, then RMP 230 displays the identity of those recipients indicating intent to respond. RMP 230 determines whether detailed reply information is needed (530). In other words, does the user want more information about the message recipients who has indicated that they will respond to the email? If so, RMP 230 gets detailed reply information from reply history file 240 (540). If not, RMP 230 determines whether the user wants to reply to the message (550). If the user wants to reply to the message, then the user "calls" reply to the email (560). By "call" is meant that the user indicates to RMP 230 his or her intention to reply to the email. When the user "calls" the reply, he or she does not lock out other persons who may also want to reply to the email. RMP 230 then updates the reply status for the email on the server (570), and updates the display of the reply status for other users who may have the email open (580). For example, if a reply is already open and another user then opens the email and begins a response, a message to the central server or to the peer client may update the email. RMP 230 cannot update offline users. If the user did not want to reply at step 550, or after RMP 230 updates the email of other recipients (580), RMP 230 determines whether there is another email (590). If so, RMP 230 goes to step 510. If not, RMP 230 stops (592).

In an additional embodiment, RMP 230 automatically handles emails that are forwarded to other recipients who are not on the original email, or who are not directly involved in RMP 230, or who are later left out of the message chain. In order to automatically handle such emails, RMP 230 would be configured so that the addition of an addressee to a subsequent message in a chain of messages would be added to the reply history file. Moreover, the deletion of an addressee from a subsequent message in a chain of messages would be noted in the reply history file.

In an additional embodiment, RMP 230 may be integrated with an Instant Messaging program.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for displaying a reply status and a history of an email, the method comprising:
displaying the email;
displaying an icon and a reply summary on the email, wherein the icon is a visual depiction that a recipient of the email intends to reply to the email and the reply summary comprises a short text message informing a user that a recipient of the email intends to reply to the email;
responsive to activating a get info button displayed on the email, displaying the reply status and the history in a window on the email, wherein the history includes a plurality of activities regarding the email including a date and a time of each of the plurality of activities;
responsive to activating a reply options icon, displaying a window on the email comprising an option for creating a reply that includes the history of the email;
calling the reply to the email to indicate an intent to reply to the email by the user; and responsive to the calling of the reply, updating the reply status and the history for other users that have the email open.

* * * * *